3,726,828
COMPOUNDING POLYETHER ELASTOMERS
Roger S. Hawley, Cranford, and Irving Kuntz, Westfield, N.J., assignors to Esso Research and Engineering Company
No Drawing. Continuation-in-part of application Ser. No. 594,351, Nov. 15, 1966. This application Oct. 20, 1969, Ser. No. 868,670
Int. Cl. C08f 37/18
U.S. Cl. 260—33.6 AQ
2 Claims

ABSTRACT OF THE DISCLOSURE

The compounding of polyether elastomers is enhanced by incorporating therein small amounts of terpolymers of ethylene, a higher alpha olefin, and a non-conjugated diolefin typically selected from the group consisting of 5-alkylidene-2 - norbornene, 2 - alkyl - norbornadiene, acyclic dienes, alicyclic dienes, and hydro indenes.

---

This application is a continuation-in-part of Ser. No. 594,351, now abandoned filed Nov. 15, 1966.

This invention relates to the compounding of polyether elastomers and more particularly relates to the formulation of such elastomers with large amounts of carbon black and oil.

It is well known that various polyethers can be homopolymerized and copolymerized using aluminum alkyls as catalyst, for example as described in the Vandenberg patents, Nos. 3,065,213; 3,158,580; 3,158,581 and 3,205,183. These polymers are elastomeric in nature and are capable of being vulcanized with conventional curing agents, such as sulfur. However, these polyether elastomers cannot be compounded with large amounts of carbon black and process oils or plasticizers to yield vulcanizates with acceptable physical properties. The attempt to add large amounts of oils leads to vulcanizates in which the oil "bleeds" to the surface and is unacceptable. When large amounts of carbon black are also present, poor physical properties are obtained.

In accordance with the present invention, it has been found that the above difficulties can be overcome and a vulcanizate of greatly increased tensile strength is obtained without oil bleeding by the incorporation of a relatively minor amount of a terpolymer of ethylene, a higher alpha olefin and a non-conjugated diolefin into the polyether elastomer formulation.

The polyether elastomers to which this invention applies are homopolymers or copolymers of two or more oxiranes and oxetanes including ethylene oxide, propylene oxide, epichlorohydrin, epibromohydrin or any 1-olefin epoxide generally, oxetane (trimethylene oxide), 2,2-bis-(chloromethyl)-oxetane, styrene oxide, and allyl glycidyl ether, butadiene monoxide, 1,2-epoxy-5-hexene, glycidyl methacrylate, or other epoxides containing olefinic unsaturation, etc. Typical polyether elastomer are terpolymers of 40 to 90 mole percent epihalohydrin, 10 to 60 mole percent propylene oxide and 1 to 10 mole percent of a 1-olefin epoxide such as allyl glycidyl ether, the copolymer of 95 mole percent propylene oxide and 5 mole percent of a 1-olefinic epoxide, such as allyl glycidyl ether and the copolymer of tetrahydrofuran and an olefin epoxide such as dicyclopentadiene monoxide or cyclododecatriene monoepoxide.

These polyether elastomers may be prepared by homopolymerizing or copolymerizing the desired monomers under the conditions described in the above-mentioned Vandenberg patents, namely by contacting them with aluminum alkyl catalysts, such as trialkyl aluminum, dialkyl aluminum monohalides, dialkyl aluminum monohydrides, monoalkyl aluminum dihalides, monoalkyl aluminum dihydrides, dialkyl aluminum monoalkoxide, etc., either alone or complexed with an ether such as tetrahydrofuran or reacted with a chelating agent such as acetylacetone, or with water in specified molar ranges. A particularly suitable catalyst is that described in application, Ser. No. 585,702, filed Oct. 10, 1966, in the names of Kuntz and Kroll, now U.S. Pat. 3,459,721, and incorporated herein by reference, namely a mixture of (1) a pure dialkyl aluminum acetylacetonate in which the alkyl group contains 1 to 8 carbon atoms; (2) a dialkyl metal such as dialkyl zinc or dialkyl cadmium in which the alkyl group contains 1 to 10 carbon atoms; and (3) water, in which the dialkyl aluminum acetylacetonate and the dialkyl metal are each present in amounts between 0.1 and 10 mole percent on total monomers and in which the molar ratio of dialkyl metal to dialkyl aluminum acetylacetonate is 0.1 to 10 and the molar ratio of water to dialkyl aluminum acetylacetonate is 0.1 to 1.5.

The terpolymer which is to be added to the polyether elastomer in accordance with this invention is prepared by copolymerizing ethylene with a higher alpha olefin and a straight chain, branched chain or cyclic non-conjugated diolefin. The ethylene monomer unit concentration of the terpolymer ranges in general from about 20% to about 75% by weight and at least one alpha olefin having the general formula R—CH=CH$_2$ wherein R is a C$_1$ to C$_8$ alkyl radical; preferably R is a C$_1$ to C$_4$ alkyl radical is present in a concentration in the range of about 24 to about 75% by weight. The alpha olefin may be linear or branched and, while a single alpha olefin is preferable, mixtures of alpha olefins may be employed. Suitable examples of alpha olefins having the general formula

R—CH=CH$_2$ include: propylene, 1-butene, 1-pentene, 1-hexene, 1-heptene, 1-octene, 1-nonene, 1-decene, 4-methyl-1-pentene, 4 - methyl - 1 - hexene, 5 - methyl - 1 - hexene, 4,4 - dimethyl - 1 - pentene, 4 - methyl - 1 - heptene, 5 - methyl - 1 - heptene, 6 - methyl - 1 - heptene, 4,4-dimethyl - 1 - hexene, 5,6,6 - trimethyl - 1 - heptene, 5,5-dimethyl - 1 - octene, 5 - methyl - 1 - nonene and the like; particularly preferred herein is propylene. The concentration of R—CH=CH$_2$ monomer units ranges in general from about 24% to about 75% by weight.

The third monomer unit employed in preparing the terpolymer may be a non-conjugated diolefin. It may be a cyclic branched or straight chain non-conjugated diolefin having 6–15 carbon atoms. Typically, the non-conjugated diolefin may be:

(a) 5-alkylidene-2-norbornene,
  including: 5-methylene-2-norbornene, 5-ethylidene-2-norbornene;
(b) 5-alkenyl-2-norbornene,
  including: 5 - vinyl - 2 - norbornene, 5-(3'-butene)-2-norbornene, etc.;
(c) 2-alkyl-norbornadiene,
  including: 2 - methyl - norbornadiene, 2 - ethyl-norbornadiene, etc.;
(d) acyclic non-conjugated dienes
  including: 2,4 - dimethyl - 2,7 - octadiene, 11-ethyl-1,11 - tridecadiene, 1,4 - hexadiene, etc.;
(e) alicyclic non-conjugated dienes
  including: 3 - methallyl cyclopentene, 3-(2'-methyl-1-propane) cyclopentene, dicyclopentadiene, 1,5-cyclooctadiene, etc.;
(f) hydroindenes
  including: 4,7,8,9 - tetrahydroindene or any of the other hydroindenes disclosed in Ser. No. 256,264, now abandoned, filed Feb. 5, 1963.

The diolefin monomer units should be present in sufficient amounts to provide for adequate sulfur curability, i.e., at least 1% by weight of the terpolymer; the maximum amount present should be such as to not interfere seriously with the elastic character of the terpolymer, i.e. not over about 20% by weight. Preferably, the terpolymer should contain 3 to 15% diolefin monomer units based on the weight of the terpolymer.

As another indication of adequate sulfur curability, the iodine number of the terpolymer should range between about 2 and 60, preferably 5 to 40. The iodine number is a measure of the total unsaturation of the terpolymer.

Of especial interest for the purpose of this invention are the terpolymers of ethylene, propylene and a diolefin as described in U.S. Pat. No. 3,093,620. These elastomers bear the ASTM designation EPDM.

The catalyst system employed in preparing the terpolymer comprises two components, namely a catalyst and a cocatalyst. The catalyst is a reducible heavy metal compound such as a halide, acetonyl acetonate and the like of a metal of Group IV$b$ through VI$b$ and Group VIII of the Periodic System$b$, e.g. of titanium, zirconium, vanadium, chromium, molybdenum and iron. See, e.g. Belgian Pat. No. 533,362 and "Chemical and Engineering News," Apr. 8, 1957, pages 12 through 16.

Suitably, the catalyst may be selected from the group consisting of vanadium halides, vanadium oxyhalides, alkyl vanadates and alkylhalovanadates, wherein the halogen has an atomic number of at least 17, i.e. the halogen may be chlorine, bromine, or iodine, e.g. $VCl_4$, $VBr_4$, $VOCl_3$, $VOBr_3$, $Vo(OR)_3$, $VOCl(OR)_2$, wherein R is a lower alkyl group. Particularly preferred herein are vanadium tetrachloride and vanadium oxychloride.

The cocatalyst employed comprises an organometal having the general formula $R'_nMX_y$, wherein $R'$ is a monovalent hydrocarbon radical of 1 to 12 carbon atoms, M is a metal of Groups Ia, IIa, and IIIa of the Periodic System, X is a halogen with an atomic number of at least 17, i.e. X may be chlorine, bromine or iodine, $n$ is an integer of one to three inclusive, $y$ is an integer of zero to two inclusive, and the sum of $n$ and $y$ is equal to the valence of the metal M. The Periodic System employed in describing the catalyst system of this invention is that which appears in "Merck Index," Merck & Co., Inc., Rahway, N.J., seventh edition (1960).

R', in the general formula above, may be the same or different (i.e. when $n$ is gerater than one) monovalent hydrocarbon radicals. Examples of suitable R' groups include aryl radicals, aliphatic hydrocarbon radicals or derivatives such as alkyl, cycloalkyl-alkyl, cycloalkenyl-alkyl, aryl-alkyl, cycloalky, aryl-cycloalkyl, cycloalkyl alkenyl, alkyl-aryl or cycloalkyl-aryl radicals.

Specific examples of R' groups for substitution in the above formula include methyl, ethyl, n-propyl, isopropyl, n-butyl, isobutyl, n-amyl, isoamyl, n-hexyl, n-octyl, n-decyl, and the like; 2-butenyl, 2-methyl-2-butenyl and the like; cyclopentylmethyl, cyclohexyl-ethyl, cyclopentyl-ethyl, methylcyclopentyl-ethyl, 4-cyclohexenylethyl, and the like; 2-phenylethyl, 2-phenylpropyl, α-naphthylethyl, methylnaphthylenthyl, and the like; cyclopentay, cyclohexyl, 2,2,1-bicycloheptyl, and the like; methylcyclopentyl, dimethylcyclopentyl, ethylcyclopentyl, methylcyclohexyl, dimethylcyclohexyl, ethylcyclohexyl, isopropylcyclohexyl, 5-cyclopentadienyl, and the like; phenylcyclopentyl, phenylcyclohexyl, the corresponding naphthyl derivatives of cycloalkyl groups, and the like; phenyl, tolyl, xylyl, ethylphenyl, naphthyl, methylnaphthyly, dimethylnaphthy ethylphenyl, naphthyl, methylnaphthyl, dimethylnaphtyl, ethylnaphthyl, cyclohexylphenyl, and the like.

Particularly valuable as second components are the lower alkyl aluminum compounds, especially trialkyl aluminum compounds such as triethyl aluminum, tripropyl aluminum, triisobutyl aluminum, and the like, and the lower dialkyl aluminum compounds such as diethyl aluminum halides, e.g. diethyl aluminum chloride, dipropyl aluminum chloride, diisobutyl aluminum chloride, and the like. The lower monoalkyl alkyl aluminum halides, e.g. ethyl aluminum dichloride, can also be used. Additionally, organoaluminum compounds having one or more $C_1$ to $C_8$ hydrocarbon radicals and two or more electron-attracting groups such as alkoxy, organic nitrogen or sulfur groups can also be used. Particularly preferred herein are aluminum diethyl chloride and aluminum sesquichloride.

The components of the catalyst system, i.e. the catalyst and the cocatalyst, are preferably mixed with an inert organic diluent prior to their use int he polymerization reaction. Alternatively, the components of the catalyst system may be mixed or added individually to the reactants in the absence of any diluents. Generally, the molar ratio of the cocatalyst (the organometal compound) to the catalyst is in the range of 1:1 to 16:1, preferably 1.5:1 to 6:1. The total amount of catalyst employed in the polymerization reaction varies somewhat upon the choice of the particular components of the catalyst system, but is generally in the range of about 0.0005 to about 0.02 wt. percent, preferably 0.001 to 0.01 wt. percent based upon the total reaction mixture.

The inert organic diluent for the catalyst system can also serve as the polymerization medium. Suitable examples of the diluent, which should be a liquid at the operating conditions of the polymerization reaction, include aliphatic hydrocarbons such as pentane, hexane, isooctane and the like; cycloaliphatic hydrocarbons such as cyclopentane, cyclohexane, decahydronaphthalene and the like; halogenated hydrocarbons such as methyl chloride, tetrachloroethylene and the like; aromatic hydrocarbons such as benzene, toluene, ethylbenzene, xylene, tetrahydronaphthalene and the like; halogenated aromatic hydrocarbons, e.g. mono- or di-chlorobenzenes and the like. Although the concentrations of the catalyst components are not critical, sufficient amounts of the diluent are employed such that the concentration of each component in the diluent is normally in the range of 0.1 to 10 g./l., preferably 0.5 to 5 g./l.

Alternatively, the terpolymer may be formed by reacting a selected vanadium compound with a selected titanium compound to get a reaction product which is believed to be a complex, and then adding an aluminum alkyl compound to the resulting reaction product in order to produce a catalyst composition. This catalyst composition is then used to copolymerize ethylene and a higher alpha olefin.

About 0.05 to 10 moles, preferably 0.15 to 1.5 moles, of vanadium compound are reacted per mole of titanium compound; and about 0.05 to 1.0 mole, preferably 0.10 to 0.50 mole, of the reaction product is utilized per mole of aluminum alkyl compound.

The vanadium compound may be a vanadium oxyhalide, a vanadium oxyacetylacetonate or alkyl vanadate. The vanadium oxyhalide has the formula $VOX_3$ wherein X is a halogen having an atomic number of more than 17, i.e. chlorine, bromine, or iodine. The preferred vanadium oxyhalide is $VOCl_3$.

For further information concerning the preparation of these terpolymers and the catalysts used, recourse may be had to patent application, Ser. No. 256,264, now abandoned, filed Feb. 5, 1963; U.S. Pat. 3,438,951, issued Apr. 15, 1969; patent application, Ser. No. 613,727, now abandoned, filed Feb. 3, 1967 (which is a continuation-in-part of patent applications, Ser. No. 504,120, filed Oct. 23, 1965 (now abandoned) and Ser. No. 464,862, filed June 17, 1965 (now abandoned), each of which is incorporated herein by reference.

The terpolymer is added to the polyether elastomer in the proportion of 5% to 95% by weight based on the total polymer, preferably 5 to 60 wt. percent.

A variety of oils, carbon blacks, clays and silicas may be used as filler for the polymer composition of this invention. The carbon blacks which are useful include SAF, ISAF, SRF, HAF, FEF, and MPC blacks, all of which are commercially available. The amount of carbon black used can be from 50 to 300 parts by weight, but preferably 100 to 200 parts per 100 parts of elastomer is used. From 15 to 250 parts by weight of oil can also be added to obtain the desired balance of physical and processing properties in the final compound.

SULFUR CURE

The necessary ingredients for this type of cure are sulfur and an accelerator which contains sulfur in its structure. This latter material accelerates the vulcanization process of addition to the double bond and therefore makes for a shorter cure time with a more efficient cure. A minimum of one part of sulfur appears necessary for a satisfactory vulcaniate. Using four parts or more of sulfur results in a poorer vulcaniate due to the degrading effect of the free sulfur which has not been utilized. Accelerator concentrations vary considerably; with selenium diethyl dithiocarbamate, however, best results are given by a 1 to 5, preferably 3 parts, concentration. At least one part would be necessary for an acceptable cure with no other accelerators present. Six parts of this material give poor results.

PARAQUINONE DIOXIME CURE

A combination of paraquinone dioxime and lead oxide are capable of vulcanizing the polymer. The chemical reactions involved in the vulcanization of the polymer by quinone dioxime in the presence of an oxidizing agent appear to consist in the formation of aromatic nitroso groups which in turn react with the unsaturation in the polymer chain. Some sulfur is necessary to produce faster and more tightly vulcanized compounds. Paraquinone dioxime concentrations are from one to eight and the lead oxide concentrations from five to twenty parts. The ratio of 6 paraquinone dioxime and 10 lead oxide is the most efficient combination. The sulfur concentration ranges between 0.5 and 4 parts, with 2 parts being preferred.

BENZOTHIAZYL DISULFIDE CURE

Benzothiazyl disulfide acts as a mild oxidizing agent for paraquinone dioxime by virtue of the cleavage of the disulfide to form two mercaptan molecules. Apparently, the conversion of the dioxime to the nitroso group brought about by the loss of a hydrogen atom results in the same type of vulcanization mechanism as for the paraquinone dioxime cure. The reaction in this case, however, is not as rapid as for the paraquinone dioxime lead oxide blend. The following limits apply for this particular cure: benzothiazyl disulfide 1.0 to 6.0, preferably 4; paraquinone dioxime 1.0 to 8.0, preferably 2; sulfur 0.5 to 4.0, preferably 2.

PARAQUINONE DIOXIME DIBENZOATE CURE

The action of this quinone is identical with that of paraquinone dioxime when reacted with lead oxide. The following concentrations are suitable: paraquinone dioxime dibenzoate 1 to 10, preferably 6; lead oxide 5 to 20, preferably 10; sulfur 0.5 to 4.0, preferably 2.0.

This invention and its advantages will be better understood by reference to the following examples.

EXAMPLE 1

A polyether elastomer was prepared by copolymerizing a feed consisting of various amounts of epichlorohydrin, propylene oxide and allyl glycidyl ether in the presence of a catalyst consisting of 3.6 millimoles of diisobutylaluminum acetylacetonate, 1.8 millimoles of water and 3.6 millimoles of diethylzinc. To the resulting elastomer was added 25 weight percent of a terpolymer of ethylene, propylene and 5-methylene-2-norbornene and the mixture compounded on the rubber mill and cured. The following data were obtained.

TABLE I.—POLYETHER RUBBER COVULCANIZATES WITH EPDM

| Column | 1 | 2 | 3 | 4 | 5 | 6 |
|---|---|---|---|---|---|---|
| Polyether elastomer | | | | | | |
| A[1] | 100 | | | | | |
| B[2] | | 75 | | | | |
| C[3] | | | 100 | 75 | 100 | 75 |
| Terpolymer | | | | | | |
| D-1[4] | | 25 | | 25 | | |
| D-2[5] | | | | | | 25 |
| Antioxidant | [6]1 | [7]1 | [8]0.5 | [8]0.5 | [8]0.5 | [8]0.5 |
| Carbon black | [10]100 | [11]100 | [11]50 | [11]60 | [11]50 | [11]60 |
| Process Oil | [13]50 | [13]50 | [13]15 | [13]30 | [13]30 | [13]30 |
| Dioctyl phthalate | | | 15 | | | |
| Cure system | ([14]) | ([14]) | ([14]) | ([14]) | ([14]) | ([14]) |
| Vulcanizate properties [16] | | | | | | |
| Tensile | 610 | 1,365 | 2,430 | 21,50 | 920 | 2,010 |
| Modulus, 300%, p.s.i. | | 775 | 725 | 940 | 550 | 865 |
| Elongation, percent | 175 | 595 | 745 | 590 | 450 | 595 |
| Shore A hardness | 74 | 75 | 50 | 67 | 55 | 65 |
| Oil migration | Yes | No | Yes | No | Yes | No |

[1] A is a Polyether elastomer made from epichlorohydrin (63 mole percent in feed), propylene oxide (31 mole percent), and allyl glycidyl ether (6 mole percent).
[2] B is a Polyether elastomer made from epichlorohydrin (66 mole percent in feed), propylene oxide (32 mole percent), and allyl glycidyl ether (2 mole percent).
[3] C is a Polyether elastomer made from epichlorohydrin (65 mole percent in feed) propylene oxide (32 mole percent), and allyl glycidyl ether (3 mole percent).
[4] D-1 is a EPDM elastomer (55 wt. percent ethylene, 42 wt. percent propylene) and 3 wt. percent 5-methylene-2-norbornylene, having a Mooney viscosity ($M_L1+8$ at 260° F.), of 60–65.
[5] D-2 is a EPDM elastomer (55 wt. percent ethylene, 42 wt. percent propylene) and 3 wt. percent 5-methylene-2-norbornylene, having a Mooney viscosity ($M_L1+8$ at 212° F.), of 40–45.
[6] AgeRite Resin D.
[7] 2,2'-methylene bis (4-methhl-6-tertiary butyl phenol).
[8] Phenylbetanaphthylamine.
[9] Nickel dibutyl dithiocarbomate.
[10] FEF.
[11] SAF.
[12] ISAF.
[13] White oil.
[14] 1 phr. stearic acid, 5 ZnO, 0.75 sulfur, 1.25 Tellurac (80%), and 1.00 Altax.
[15] 1 phr. stearic acid, 2 ZnO, 0.80 sulfur, and 0.60 Unads.
[16] Press cured 40 minutes at 307° F.

The above data show that the addition of twenty-five parts by weight of terpolymer to the polyether elastomer gives a vulcanizate with improved properties. Columns 1 and 5 show the poor properties that are obtained with the high carbon black loaded polyether elastomer alone. The tensile strength is low and the oil migrates to the surface. When the amount of black is markedly reduced (column 3) to increase the tensile, the oil still migrates to the surface. The addition of twenty-five parts by weight of the EPDM terpolymer (columns 2 and 6) to the formulation increases the tensile strength (column 1 versus column 2 and column 6 versus column 5). Columns 2, 4 and 6 show that the addition of the terpolymer also prevents the migration of the oil to the surface when compared with columns 1, 3 and 5. It is totally unexpected and outstanding to be able to achieve a product which in the presence of, e.g. 50 parts oil, is free of blooming. Comparison of columns 1 and 2 clearly reveals that this is not attainable in prior art techniques. One skilled in the art would not have expected to obtain the satisfactory physical properties, (e.g. increase in tensile strength by a factor of about double), so obtained without blooming in the presence of the large amount of oil.

EXAMPLE 2

Example 1 was repeated except that the polyether elastomer was a copolymer of 95 mole percent of propylene oxide and 5 mole percent of allyl glycidyl ether. The following data were obtained:

TABLE II.—POLYETHER RUBBER COVULCANIZATES WITH EPT

| Column | 7 | 8 |
|---|---|---|
| Polyether elastomer | 100 | 75 |
| Terpolymer, D-1 | | 25 |
| Antioxidadt | [9] 1 | [9] 1 |
| Carbon black | [12] 100 | [12] 100 |
| Process Oil | [13] 50 | [13] 50 |
| Cure system | ([15]) | ([15]) |
| Vulcanizate properties:[16] | | |
| Tensile | 965 | 985 |
| Modulus, 300%, p.s.i | 410 | 590 |
| Elongation, percent | 680 | 600 |
| Shore A harddess | 52 | 63 |
| Oil migration | Yes | No |

See footnotes 9, 12, 13, 15, and 16 at end of Table I.

The above data show that the addition of twenty-five parts of the terpolymer to the formulation with copolymer of propylene oxide and allyl glycidyl ether prevents the migration of oil from the vulcanizate. Compositions of this invention containing the ingredients in other proportions as herein set forth may be found to give comparable results.

EXAMPLE 3

As a further illustrative example, 75 parts of a polyether elastomer (made from 65 mole percent epichlorohydrin, 32 mole percent propylene oxide, and 3 mole percent allyl glycidyl ether) may be blended with 25 parts of an EPDM elastomer made from 55 wt. percent ethylene, 42 wt. percent propylene, and 3 wt. percent 5-ethylidene-2-norbornene having a Mooney viscosity ($M_L1+8$ at 260° F.) of 60–65. The mixture may be further compounded with 30 parts of Process Oil, 60 parts of SAF carbon black, 0.5 part of phenyl beta naphthylamine antioxidant, and cure system (m) supra, which after vulcanization yields a product characterized by: (a) tensile strength of typically 2000–2200 (i.e. double that which would be expected); (b) a Modulus, 300%, typically of 800–1000 (i.e. almost double that of, e.g. control, Example 5 of Table I); (c) an elongation of about 500–600% which would be 10%–33% above that of a typical control; (d) a Shore A hardness of 64–68 which is unexpectedly different from the control; and most significantly (e) a total absence of blooming or oil migration despite the presence of such large amounts of process oil.

It is totally unexpected to be able to obtain a polyether elastomer product which contains such a large proportion of Process Oil and which would be characterized by freedom from blooming and surprisingly which possesses physical properties including tensile strength, hardness, elongation, and modulus which may be superior. One skilled in the art would normally expect that presence of Process Oil in the noted amounts would adversely affect the noted properties by significant proportions.

The nature of the present invention having thus been fully set forth and examples of the same given, what is claimed as new, useful and unobvious and desired to be secured by Letters Patent is:

1. A composition of matter comprising:
(A) 5 to 95 parts by weight of a polyether elastomer consisting of:
 (a) 63–66 mole percent of epichlorohydrin;
 (b) 31–32 mole percent of propylene oxide; and
 (c) 2–6 mole percent of allyl glycidyl ether;
(B) 5 to 95 parts by weight of a terpolymer of ethylene, a higher alpha olefin of 3 to 10 carbon atoms and a non-conjugated diolefin;
(C) 50 to 300 parts by weight of carbon black; and
(D) 15 to 250 parts by weight of processing oil; the sum of the weights of said polyether elastomer and said terpolymer in said composition being equal to 100 parts by weight.

2. A composition of matter comprising:
(A) 5 to 95 parts by weight of a polyether elastomer consisting of:
 (a) 95 mole percent of propylene oxide; and
 (b) 5 mole percent of allyl glycidyl ether;
(B) 5 to 95 parts by weight of a terpolymer of ethylene, a higher alpha olefin of 3 to 10 carbon atoms and a non-conjugated diolefin;
(C) 50 to 300 parts by weight of carbon black; and
(D) 15 to 250 parts by weight of processing oil; the sum of the weights of said polyether elastomer and said terpolymer in said composition being equal to 100 parts by weight.

References Cited

UNITED STATES PATENTS

| | | | |
|---|---|---|---|
| 3,351,517 | 11/1967 | Willis | 161—184 |
| 3,093,621 | 6/1963 | Glading | 280—80.78 |
| 3,158,580 | 11/1964 | Vandenberg | 280—33.6 |
| 3,262,902 | 7/1966 | Robinson | 280—37 ALO |
| 3,278,457 | 11/1966 | Milgrom | 280—887 |
| 3,285,804 | 11/1966 | Robinson | 280—887 |
| 3,341,475 | 9/1967 | Vandenberg | 280—33.6 EP |

FOREIGN PATENTS 962,519  7/1964  Great Britain.

OTHER REFERENCES

Rubber World: "Materials and Compounding Ingredients For Rubber and Plastics," (1965 ed.), pp. 131 and 133.

Du Pont: Development Products Report, vol. 18, ECD–330 (December 1961), cover and pp. 3, 6–8, and 10.

SAMUEL H. BLECH, Primary Examiner

C. J. SECCURO, Assistant Examiner

U.S. Cl. X.R.

260—23.5 A, 41 R, 897 R